United States Patent
Gargi et al.

(10) Patent No.: US 9,152,247 B2
(45) Date of Patent: Oct. 6, 2015

(54) COMPUTING DEVICE WITH FORCE-TRIGGERED NON-VISUAL RESPONSES

(71) Applicants: Ullas Gargi, Sunnyvale, CA (US);
Richard Carl Gossweiler, III, Sunnyvale, CA (US)

(72) Inventors: Ullas Gargi, Sunnyvale, CA (US);
Richard Carl Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 13/732,946

(22) Filed: Jan. 2, 2013

(65) Prior Publication Data
US 2014/0111415 A1   Apr. 24, 2014

Related U.S. Application Data

(60) Provisional application No. 61/718,059, filed on Oct. 24, 2012.

(51) Int. Cl.
*G06F 3/01* (2006.01)
*G06F 3/0346* (2013.01)
*G06F 3/0488* (2013.01)

(52) U.S. Cl.
CPC .............. *G06F 3/0346* (2013.01); *G06F 3/017* (2013.01); *G06F 3/04883* (2013.01); *G06F 2200/1636* (2013.01); *G06F 2200/1637* (2013.01)

(58) Field of Classification Search
None
See application file for complete search history.

(56) References Cited

U.S. PATENT DOCUMENTS

| | | |
|---|---|---|
| 2007/0257097 A1 | 11/2007 | Nurmela et al. |
| 2008/0168290 A1* | 7/2008 | Jobs et al. .................... 713/324 |
| 2010/0073329 A1* | 3/2010 | Raman et al. ................ 345/177 |
| 2010/0088061 A1 | 4/2010 | Horodezky et al. |
| 2011/0029869 A1* | 2/2011 | McLennan .................... 715/702 |
| 2011/0187640 A1 | 8/2011 | Jacobsen et al. |
| 2012/0223890 A1* | 9/2012 | Borovsky et al. ............. 345/173 |
| 2014/0062682 A1* | 3/2014 | Birnbaum et al. ......... 340/407.2 |

FOREIGN PATENT DOCUMENTS

| | | |
|---|---|---|
| EP | 1930835 A1 | 12/2006 |
| EP | 2131263 A1 | 4/2009 |

OTHER PUBLICATIONS

Pogue, "Apple's Assistive Touch Helps the Disable Use a Smartphone," New York Times, Retrieved from http://pogue.blogs.nytimes.com/2011/11/10/apples-assistivetouch-helps-the-disabled-use-, accessed on Nov. 17, 2011, 17 pp.

"The 4 Best Lock Screen Replacement Apps for Your Android Service," Retrieved from http://www.vikitech.com/6075/best-android-lock-screen-apps, accessed on Nov. 17, 2011, 5 pp.

(Continued)

*Primary Examiner* — Joseph Haley
*Assistant Examiner* — Emily Frank
(74) *Attorney, Agent, or Firm* — Shumaker & Sieffert, P.A.

(57) ABSTRACT

In one example, a method includes receiving, by a computing device, an indication of a detected force applied to the computing device. The method further comprises determining, by the computing device, that the detected force matches a corresponding input that the computing device associates with a corresponding function that is executable by the computing device. The method further comprises generating, by the computing device and in response to determining that the detected force matches the corresponding input and, a non-visual output based on the corresponding function.

24 Claims, 5 Drawing Sheets

(56) References Cited

OTHER PUBLICATIONS

"HTC Sence," Retrieved from http://en.wikipedia.org/wiki/HTC_Sense, accessed on Nov. 17, 2011, 4 pp.

"iOS 5: Complete list of 200 + New Features," Retrieved from http://techzoom.org/ios-5-complete-list-of-200-new-features/, accessed on Nov. 17, 2011, 62 pp.

Savoy, "Samsung Galaxy S II review," Retrieved from http://www.engadget.com/2011/04/28/samsung-galaxy-s-ii-review/, accessed on Nov. 17, 2011, 18 pp.

Seraphin, "My First Week with the iPhone," Retrieved from http://behindthecurtain.us/2010/06/12/my-first-week-with-the-iphone/, accessded on Nov. 17, 2011, 10 pp.

"Smartphoneevnycom," Retrieved from http://www.smartphoneenvy.com/featured/meego-pr1-1-lands-on-nokia-n9/, accessed on Nov. 17, 2011, 1 p.

"User Interface," Retrieved from http://developer.android.com/guide/topics/ui/index.html, accessed on Nov. 14, 2011, 1 p.

Selleck, "Which company has the best lock screen for their mobile OS?" Retrieved from http://www.phonedog.com/2011/07/31/which-company-has-the-best-lock-screen-for-their-mobile-os, accessed on Nov. 17, 2011, 10 pp.

International Search Report and Written Opinion from International Application No. PCT/US2013/066158, dated Feb. 26, 2014, 11 pp.

\* cited by examiner

COMPUTING DEVICE WITH FORCE-TRIGGERED NON-VISUAL RESPONSES

RELATED APPLICATION

This application claims the benefit of U.S. Provisional Application No. 61/718,059, filed Oct. 24, 2012, the entire content of which is incorporated herein by reference.

BACKGROUND

Many mobile computing devices such as smartphones and tablet computers have touchscreens that provide graphical outputs and enable users to enter inputs via touch gestures and/or virtual or hardware keyboards or buttons. Mobile computing devices may also provide audio outputs, and enable user inputs via virtual or hardware keyboards and buttons. Mobile computing devices may provide a variety of functions including telephony, email, text messaging, web browsing, etc.

Keyboard and touch gesture inputs and graphical outputs may be the primary modes of a user's interaction with a mobile computing device. A user may typically begin interacting with a computing device such as a smartphone or tablet computer by positioning the computing device where the user can view its display and can enter gesture inputs to virtual icons or keys presented at the display.

SUMMARY

In one example, a method includes receiving, by a computing device, an indication of a detected force applied to the computing device. The method further comprises determining, by the computing device, that the detected force matches a corresponding input that the computing device associates with a corresponding function that is executable by the computing device. The method further comprises generating, by the computing device and in response to determining that the detected force matches the corresponding input, a non-visual output based on the corresponding function.

In another example, a computing device includes at least one processor. The at least one processor is configured to receive an indication of a detected force applied to the computing device. The at least one processor is further configured to determine that the detected force matches a corresponding input that the at least one processor associates with a corresponding function that is executable by the at least one processor. The at least one processor is further configured to generate, in response to determining that the detected force matches the corresponding input, a non-visual output based on the corresponding function.

In another example, a computer-readable storage medium includes instructions that are executable by the at least one processor to receive, by the at least one processor, an indication of a detected force applied to a computing device. The instructions are further executable by the at least one processor to determine, by the at least one processor, that the detected force matches a corresponding input that the at least one processor associates with a corresponding function that is executable by the at least one processor. The instructions are further executable by the at least one processor to generate, in response to determining that the detected force matches the corresponding input and by the at least one processor, a non-visual output based on the corresponding function.

The details of one or more embodiments are set forth in the accompanying drawings and the description below. Other features, objects, and advantages will be apparent from the description and drawings, and from the claims.

BRIEF DESCRIPTION OF DRAWINGS

The various described features are not drawn to scale and are drawn in a simplified form in which one or more features relevant to the present application are emphasized. Like reference characters denote like elements throughout the figures and text.

DETAILED DESCRIPTION

Figure 1:
FIG. 1 is a perspective diagram illustrating a user interacting with an example computing device configured to generate non-visual outputs in response to force-based inputs in accordance with aspects of the present disclosure.

Techniques and methods are disclosed herein whereby a computing device can provide force-triggered non-visual responses to user inputs. In some implementations, such responses can be output by the mobile computing device without the user accessing a touchscreen or keyboard, and without the user having to look at or handle the computing device. Techniques of this disclosure can also provide new opportunities for wearable computing and for interacting with a device without interfering with personal social interaction. Techniques of this disclosure can also provide device accessibility for users with sensory impairments, or within the context of operating a vehicle or other machine.

This disclosure is further directed to a computing device receiving acceleration-based or squeeze-based inputs and, in response, the computing device outputting non-visual responses, such as audio or vibration outputs. These non-visual outputs generated in response to receiving acceleration-based or squeeze-based inputs (collectively, "force-based inputs") can be referred to generally as force-triggered non-visual responses. In some examples, the computing device can output non-visual responses while a presence-sensitive screen of the device is off or locked. Generating force-triggered non-visual responses can enable a user to access functionality of a computing device without having to go through the process of unlocking or turning on the device's screen, and without directly handling the computing device. A user can make use of functions of the computing device while the computing device remains in the user's pocket, with the user tapping the device through the cloth of the user's pants, for example. A user can also tap or squeeze a computing device to activate certain features without having to look at the computing device, such as when the user is driving. Force-triggered non-visual responses can also serve as an accessibility feature for users who have a visual impairment, in some examples.

A computing device may use any force-based inputs that can be sensed through any type of force sensor, such as an accelerometer or a compression/squeeze sensor. A computing device may respond to force-based inputs in the form of any input detectable by an accelerometer, a compression/squeeze sensor, or other sensors. These force-based inputs may include tapping, squeezing, shaking, or rotating the computing device. The computing device can also combine these force-based inputs with inputs from a Global Positioning System (GPS) sensor, a cellular/WiFi position sensor, a touchscreen, a light sensor, a magnetic field sensor, a near field communication (NFC) tag sensor, etc. (collectively, "non-force-based inputs"). A computing device may respond to a combination of force-based inputs and non-force-based inputs to provide additional modes of interaction for responding to force-based inputs.

As one example of a non-visual output a computing device may generate in response to force-based inputs, a computing device may respond to a tapping input by using speech synthesis to generate a speech audio output. This force-triggered speech audio output may include the current time of day, calendar events for the day, news headlines, a weather forecast, selected stock quotes or market indexes, or the name and phone number of a caller if the user taps the computing device while it has an incoming phone call, for example. The computing device may respond to a phone call conveyed over a traditional telephony network or over a packet-based network, such as by a web-based application over the Internet, for example. The computing device may provide different responses to different tap inputs during an incoming phone call. In one example, if a call is incoming, the computing device may respond to a single tap by answering the call on speaker, respond to two taps by generating a speech synthesis output stating the caller's name and phone number, or respond to three taps by muting the incoming call, e.g., by stopping a ringing or vibrating output.

A computing device may also provide different responses to a tap input or other force-based input subsequent to an audio or vibration output indicating arrival of a new email, text message, or social networking notification. For example, a computing device may respond to different tap inputs or other force-based inputs by generating a speech synthesis output identifying the sender of the message or reading the message to the user, or generating vibration outputs or other outputs identifying whether the caller or message sender is on a list of high-value contacts. In other examples, a computing device may respond to different tap inputs or other force-based inputs by opening an interactive application using speech synthesis audio outputs in response to voice inputs, such as for web search, map search, or road navigation.

In other examples, a computing device may generate other types of non-visual responses besides audio or vibration outputs in response to force-based inputs, potentially in combination with audio or vibration outputs. In various examples, a computing device may respond to different force-based inputs by generating an output to check into a location on a location-based app; to open a local sharing group to share files or other data with other local computing devices; to start or stop a position-tracked route (with tracking by GPS, Wi-Fi navigation, etc.) in a route tracking application; to mark a location for a geocaching app; to interact with remote control apps, such as to lock or unlock the user's car or start the engine, or to turn the user's TV on or off; or to start an audio recorder with transcription, which might include saving to a notepad or word processing app or opening an email app and transcribing into an email message draft.

A computing device may have an initial default set of non-visual responses corresponding to different force-based inputs. A computing device may also enable the non-visual responses it generates corresponding to different force-based inputs to be configurable by the user. In one example, a computing device may have an initial default setting to respond to a single tap by generating a speech synthesis output stating the current time of day, to respond to two taps by generating a speech synthesis output stating remaining events for the day from a calendar application, and to respond to three taps by generating a speech synthesis output stating a current local weather forecast. The computing device may provide options for a user to reconfigure the responses generated for these inputs, and to set any other corresponding functions for input patterns to the accelerometer, compression sensor, or other force sensor, potentially also conditional on other sensor inputs or states. An example of a computing device implementing features such as those described above is shown in FIG. 1.

FIG. 1 is a perspective diagram illustrating a user 1 interacting with an example computing device 10 configured to generate non-visual outputs in response to force-based inputs in accordance with aspects of the present disclosure. Computing device 10 is inside the user's pocket in this view. As shown in the example of FIG. 1, the user taps on computing device 10 inside the user's pocket, which computing device 10 detects and interprets as a tap input 14. Tap input 14 may include a single tap, two or more taps, a squeeze, an oscillating acceleration indicative of the mobile computing device being shaken, or other pattern of force or motion applied to computing device 10. Computing device 10 may compare the tap input 14 with stored force-based input parameters that may be associated with one or more corresponding functions that are executable by the mobile computing device 10.

For example, the tap input 14 may be a sequence that includes both a single tap followed by a double tap. In this example, computing device 10 may associate a single tap input with a corresponding function of outputting a current time using data from a clock application, while computing device 10 may associate a double tap input with a corresponding function of outputting information from or about recently received emails using data from an email application. In response to determining that the detected forces match the corresponding inputs, i.e., the stored input parameters associated with the corresponding functions, computing device 10 executes the corresponding functions, i.e., outputting the current time and information about recently received emails, in this example. Executing the corresponding functions includes the computing device 10 generating non-visual outputs based on the corresponding functions, such as computing device 10 generating speech synthesis audio output 16 of the current time and with information about recently received emails, in this example. In other examples, computing device 10 may respond to a single tap or double tap, or other force-based input, by generating a speech synthesis audio output with information from recently received text messages using data from a text message application, or from recently received social networking updates using data from a social networking application, for example.

In another example, computing device 10 may interpret different inputs from subsequent tap inputs within a period of time after an initial tap input or after a response to the first input by computing device 10. For example, the user may tap computing device 10 to enter a first input to prompt computing device 10 to generate an audio output, such as the current time, then the user may enter another one or more taps within a period of time after the initial audio output, such as a subsequent single tap to prompt computing device 10 to generate an audio output with calendar information for upcoming appointments. These input and output responses may be extended such that another single tap input within a certain period of time after the calendar audio output may prompt computing device 10 to generate yet another output, such as information on recently received emails or current stock market data. Computing device 10 may also enable the inputs and outputs for these sequences of force-based inputs to be user-configurable. Computing device 10 may define a period of time for accepting a subsequent tap input so that it doesn't begin too quickly after a prior tap, to prevent confusion with a double tap input, and so that it doesn't extend for too long, to prevent confusion with later, unrelated tap inputs or random motions, in some examples.

Computing device 10 may include logic to differentiate between distinct tap inputs or other force-based user inputs and ordinary motions that are not intended as force-based user inputs intended to elicit non-visual outputs. Computing device 10 may also use any of various aspects of context as part of differentiating intended force-based user inputs from non-input motions. For example, computing device 10 may refrain from processing detected forces for generating audio outputs when a mute switch on computing device 10 is set to mute. As another example, computing device 10 may determine whether the force is applied while a presence-sensitive display (not depicted in FIG. 1) that is operatively connected to the mobile computing device is in an activated state or in a deactivated state, e.g., the presence-sensitive display is either off or locked, or while a pair of headphones or other external audio device are plugged into an audio socket, so that computing device 10 has its default audio speakers in a deactivated state.

Computing device 10 may also refrain from processing detected forces for generating audio outputs if computing device 10 determines that a given output component such as the presence-sensitive display or the default audio output system is in an activated state. In the example noted above involving a presence-sensitive display, if computing device 10 determines that the force was applied while presence-sensitive display was in a deactivated state, computing device 10 may then, in response, execute the corresponding function and generate the non-visual output. Computing device 10 may maintain the presence-sensitive display in the deactivated state while generating the non-visual output. In the example noted above involving headphones, computing device 10 may generate audio outputs only on determining that the force was applied while headphones are plugged into the audio socket. For example, computing device 10 may generate audio outputs based on text-to-speech processing of emails to read emails aloud to the user, only if headphones are plugged into computing device 10 at the time the user enters the appropriate tap inputs, in this example.

Computing device 10 basing its outputs in part on whether a presence-sensitive display is in a deactivated state or whether headphones are plugged into an audio socket are illustrative examples of context-sensitive output modes. Computing device 10 may apply a variety of other context-sensitive output modes to determine what output channel to use for outputs in response to force-based user inputs. For example, other context-sensitive output modes may include the presence or absence of a selected Bluetooth, NFC, WiFi, or other electromagnetic signal. In various examples, computing device 10 may establish a communicative connection with a nearby car stereo system, home stereo system, or other audio player system via Bluetooth or other communicative link, and may send its audio outputs via the communicative link to be output by the connected audio system. As another example of a context-sensitive output mode, computing device 10 may detect through one or more of an accelerometer, WiFi networks, a GPS sensor, etc. whether it is moving with speeds and motions characteristic of a motor vehicle, and may generate audio outputs based in part on detecting that a motor vehicle context or "driving mode" is applicable.

Various context-sensitive output modes may be combined in some examples. For example, computing device 10 may be configured to recognize a Bluetooth signal from the user's own car and only begin generating audio outputs in response to either the Bluetooth signal from the user's car, or when computing device 10 is in a moving vehicle and headphones are plugged into the audio socket. Computing device 10 may thus avoid generating audio outputs out loud while the user is riding a bus or light rail. Computing device 10 may also prompt the user for confirmation before responding with audio outputs, such as by asking, "Okay to read emails out loud?" and continuing only if it receives a certain confirmatory force-based user input in response, such as a double tap, for example. Computing device 10 may enable each of these settings to be configured by the user in various examples.

Computing device 10 may therefore accept force-based user inputs and respond by generating audio outputs or other non-visual outputs. As another example of a non-visual output, computing device 10 may generate vibration outputs in response to specific force-based user inputs, such as either one or two vibrations to communicate information. For example, computing device 10 may be configured so that when the user enters a specific force-based input, such as a set of two taps, computing device 10 checks whether a certain contact to whom the user has sent a calendar invitation in a calendar application has sent a reply to accept the calendar invitation. Computing device 10 may be configured to respond to this force-based input by outputting a single period of vibration if the contact has sent a reply to accept the calendar invitation, a set of two periods of vibration if the contact has not yet replied, or a set of three periods of vibration if the contact has replied to reject the calendar invitation, for example.

Generating vibration outputs as non-visual outputs in response to the force-based user inputs may enable computing device 10 to provide simple and subtle modes of user interaction that may be more practical and/or socially convenient than entering inputs and viewing outputs on a display screen in some contexts. Computing device 10 may provide a capability for the user to configure force-based inputs and corresponding non-visual outputs to involve any of a wide range of specific information and/or for interacting with any type of software application.

Computing device 10 may incorporate or be operatively connected to any of a number of different sensors that may be capable of detecting forces applied to the computing device, such as an accelerometer, a compression sensor, or an acoustic sensor, for example, and may use inputs from one or multiple sensors in determining whether a detected force is consistent with and matches a force-based input. Computing device 10 may evaluate the properties of detected forces over time, and may apply different steps of filtering and processing detected forces, such as by initially screening sensor inputs for any potentially significant force detection events, and performing further processing or analysis on such potentially significant force detection events to determine whether they match a stored profile for a corresponding force-based input.

Computing device 10 may also compare potentially significant force detection events with other aspects of its operating context, such as whether the force was detected during an incoming phone call that hadn't yet been answered, or soon after the computing device 10 had generated an alert for an incoming text message or email, as is further described below.

Computing device 10 may be implemented in a variety of different forms, such as a smartphone, a tablet computer, a laptop, a netbook, a wearable computing device, or other mobile computing device, for example. Computing device 10 may also connect to a wired or wireless network using a network interface. Additional details of example computing devices are described in further detail below with respect to subsequent figures.

Figure 2:
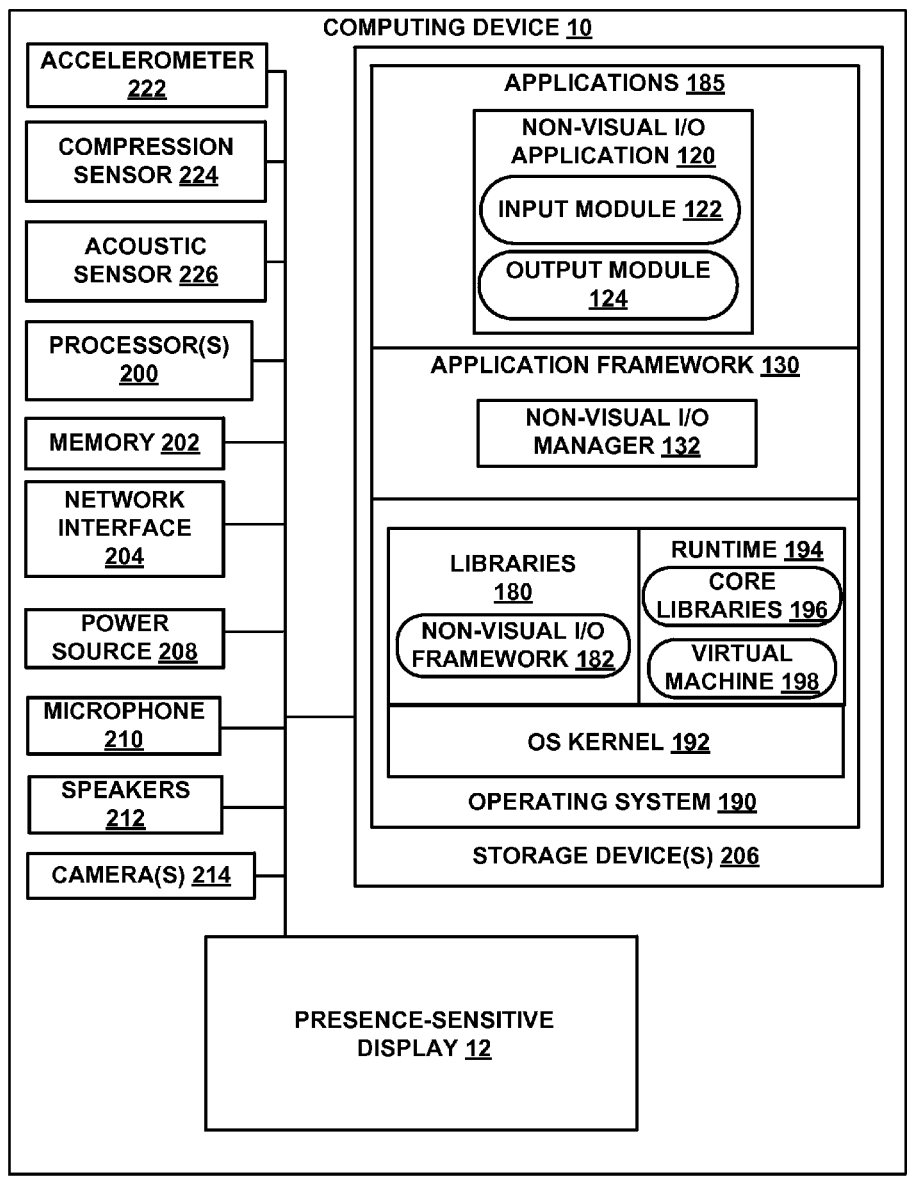
FIG. 2 is a schematic diagram illustrating an example mobile computing device configured to generate non-visual outputs in response to force-based inputs in accordance with aspects of the present disclosure.

FIG. 2 is a schematic diagram illustrating an example mobile computing device 10 configured to generate non-visual outputs in response to force-based inputs in accordance with aspects of the present disclosure. Computing device 10 in FIG. 2 is an example implementation of computing device 10 in FIG. 1. Computing devices of the present disclosure may be implemented in a variety of forms, such as a smartphone, a tablet computing device, a wearable computing device, etc., and may include additional components beyond those depicted in FIG. 2 or omit one or more of the components depicted in FIG. 2.

Computing device 10 as shown in FIG. 2 includes an accelerometer 222, a compression sensor 224, and an acoustic sensor 226, in this example. Other examples of computing devices may include any one or more of these or other sensors capable of sensing acceleration, vibration, or other indicator of an applied force. Computing device 10 also includes one or more processors 200, memory 202, a network interface 204, one or more data storage devices 206, power source 208, one or more microphones 210, one or more speakers 212, one or more cameras 214, and presence-sensitive display 12, which may be a touchscreen or other presence-sensitive display. Each of the components 222, 224, 226, 200, 202, 204, 206, 208, 210, 212, 214, and 12 may be interconnected (physically, communicatively, and/or operatively) in any of a variety of physical and/or communicative connection means for inter-component communications.

Computing device 10 has operating system 190 stored on one or more storage devices 206, and that may execute on one or more processors 200. Operating system 190, in various examples, may control aspects of the operation of components of computing device 10, and facilitate operation of higher-level software applications. Computing device 10, in this example, has applications 185 that may include a non-visual input/output (I/O) application 120 that is executable by computing device 10. Non-visual I/O application 120 may include executable instructions to perform or facilitate any or all of detecting forces applied to computing device 10, determining whether the applied forces match stored parameters for force-based inputs, gathering data or outputs from other sources or applications if necessary to respond to the force-based inputs, and outputting non-visual responses to the force-based inputs, or any other aspects of this disclosure, which may collectively be referred to as "non-visual I/O" as an abbreviated term of reference. Operating system 190, in one example, facilitates the interaction of non-visual I/O application 120 with any or all of accelerometer 222, a compression sensor 224, and an acoustic sensor 226, processors 200, memory 202, network interface 204, data storage device 206, power source 208, one or more microphones 210, one or more speakers 212, one or more cameras 214, and presence-sensitive display 12.

As shown in FIG. 2, non-visual I/O application 120 may include an input module 122 and an output module 124. Input module 122 may include portions of executable code responsible for detecting forces applied to computing device 10 and determining whether the applied forces match corresponding force-based inputs, and output module 124 may include portions of executable code responsible for performing the corresponding functions and generating non-visual outputs based on the corresponding functions, for example.

Non-visual I/O application 120, input module 122, and output module 124 may each include program instructions and/or data that are executable by computing device 10 or by at least one of the one or more processors 200 of computing device 10. For example, non-visual I/O application 120, input module 122, and/or output module 124 may include computer-executable software instructions that cause computing device 10 to perform any one or more of the operations and actions described in the present disclosure. In various examples, operating system 190 and browser application 120 may include code and/or data that are stored on one or more data storage devices 206 and that are read and executed or processed by one or more processors 200, and may in the process be stored at least temporarily in memory 202.

In this illustrative implementation of computing device 10, operating system 190 may include an operating system kernel 192, which may include various device drivers, kernel extensions, and kernel modules, for example. Operating system 190 may also include or interact with a set of libraries 180, which may include various more or less standard, specialized, open source, and/or proprietary libraries. These may include a specialized library, such as non-visual I/O framework 182, that may perform or support non-visual I/O functions in accordance with any of the examples described herein.

In an illustrative implementation of computing device 10, operating system 190 may also include or interact with a runtime 194, which may include various core libraries 196 and/or a virtual machine 198, which may be the Dalvik virtual machine in an example implementation. Virtual machine 198 may abstract certain aspects and properties of computing device 10 and allow higher-level applications 185 to run on top of virtual machine 198, so that software code in the higher-level applications 185 may be compiled into bytecode to be executed by the virtual machine 198. Computing device 10 may also have an application framework 130 that executes on top of runtime 194 and libraries 180 and that may include resources to facilitate the execution of applications 185 that execute on top of application framework 130. Other embodiments may include other elements of a software stack between the operating system kernel 192 and the top-level applications 185.

Application framework 130 may, for example, include a non-visual I/O manager 132 that itself may include executable instructions to perform or facilitate any or all of detecting forces applied to computing device 10, determining whether the applied forces match stored parameters for force-based inputs, gathering data or outputs from other sources or applications if necessary to respond to the force-based inputs, and outputting non-visual responses to the force-based inputs, or any other aspects of this disclosure. Computing device 10 may perform or facilitate any of these or other non-visual I/O functions with any one or all of the non-visual I/O application 120, the non-visual I/O manager 132 in the application framework 130, the non-visual I/O framework 182 in the libraries 180, or any other element of the software stack included in or operatively accessible to computing device 10.

In various examples, executable instructions for applications or software elements such as non-visual I/O application 120 may be written in C, which may be executable as native code by computing device 10; or may be written in Java, then compiled to virtual-machine-executable bytecode to be executed by virtual machine 198. As one illustrative example, libraries 180 may include the Standard C Library (libc), which provides native support for C functions. In different implementations, the operating system 190 and/or the virtual machine 198 may be able to execute code written in various other languages such as Objective-C, C#, C++, Go, JavaScript, Dart, Python, Ruby, or Clojure, for example, either natively, or compiled into a virtual machine-executable bytecode, or compiled into an assembly language or machine code native to the CPU of computing device 10, for example. Various examples may not use a virtual machine, and use applications that run natively on the computing device 10C or that use some other technique, compiler, interpreter, or abstraction layer for interpreting a higher-level language into code that runs natively on computing device 10.

GUI framework 182, libraries 180, or other aspect of operating system 190 or the software stack underlying the applications 185 may include code for providing any or all of the functionality for performing non-visual I/O, e.g., detecting force-based inputs and generating non-visual outputs based on functions that match the corresponding force-based inputs, in accordance with any of the examples described above, and may abstract this functionality at an underlying level for applications 185. Code for implementing the functionality of any of the aspects of this disclosure may therefore be included in any level or portion of the entire software stack running on computing device 10, or that is operatively accessible to computing device 10, such as in a web application or other program executing on resources outside of computing device 10 but that interact with computing device 10, such as via HTTP over a wireless connection, for example.

In various examples, computing device 10 may also have various application programming interfaces (APIs) that are native to operating system 190 and that run on top of operating system 190, and which are intended to provide resources that automate or facilitate higher-level applications that access the one or more APIs. These one or more APIs may include object libraries or other libraries, toolsets, or frameworks, and may be associated with a native programming environment for writing applications. Computing device 10C may also have a different specific organization of APIs, libraries, frameworks, runtime, and/or virtual machine associated with or built on top of operating system 190 other than the example organization depicted in FIG. 2.

Higher level applications, such as non-visual I/O application 120, may therefore make use of any of various abstractions, properties, libraries, or lower-level functions that are provided by any of operating system 190, OS kernel 192, libraries 180, non-visual I/O framework 182, runtime 194, core libraries 196, virtual machine 198, or other compilers, interpreters, frameworks, APIs, or other types of resources, or any combination of the above, with which computing device 10 is configured, to enable functions such as detecting force-based inputs and generating non-visual outputs based on functions that match the corresponding force-based inputs, and other functions as described herein.

The one or more processors 200, in various examples, may be configured to implement functionality and/or process instructions for execution within computing device 10. For example, processors 200 may be capable of processing instructions stored in memory 202 or instructions stored on data storage devices 206. Computing device 10 may include multiple processors, and may divide certain tasks among different processors. For example, processors 200 may include a central processing unit (CPU), which may have one or more processing cores. Processors 200 may also include one or more graphics processing units (GPUs), and/or additional processors. Processors 200 may be configured for multi-threaded processing. Processors 200 and/or operating system 190 may divide tasks among different processors or processor cores according to certain criteria, such as to optimize the user experience. Various tasks or portions of tasks may also be divided among different layers of software and hardware.

Memory 202, in various examples, may be configured to store information within computing device 10 during operation. Memory 202, in various examples, may be a computer-readable storage medium. In various examples, memory 202 is a temporary memory, and computing device 10 relies more on one or more data storage devices 206 than memory 202 for long-term storage. Memory 202, in various examples, may be a volatile memory, meaning that memory 202 may not maintain stored contents for a long duration of time once it is powered down, such as when computing device 10 is turned off. Examples of volatile memories that may characterize memory 202 include random access memories (RAM), dynamic random access memories (DRAM), static random access memories (SRAM), and other forms of volatile memories. In various examples, memory 202 may be used to store program instructions for execution by processors 200. Memory 202, in various examples, may be used by software or applications running on computing device 10 to temporarily store data and/or software code during execution of an application.

One or more data storage devices 206, in various examples, may include a computer-readable storage medium or multiple computer-readable storage media. Data storage devices 206 may be configured to store larger amounts of information than memory 202. Data storage devices 206 may further be configured for long-term storage of information. In various examples, data storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, memory 202 may also be configured for long-term data storage, and any of a variety of technologies may blur the lines between memory and data storage and between volatile and non-volatile. Memory 202 and data storage devices 206 may also include any of various caches, buffers, and other temporary memories that may be incorporated at any of various levels of a processing architecture and with various latency and capacity profiles, including a dedicated cache exclusive to a processing core or processing chip.

Computing device 10, in various examples, may also include a network interface 204. Computing device 10C, in one example, utilizes network interface 204 to communicate with external devices, such as servers or data centers, via one or more networks, which may include one or more wireless networks. Network interface 204 may be or include a network interface card, such as an Ethernet card, an optical transceiver, a radio frequency transceiver, or any other type of component that is configured to send and receive information. Other examples of such network interfaces may include Bluetooth®, 3G, 4G, LTE, and WiFi® radios configured for mobile computing devices, as well as USB. In various examples, computing device 10 may use network interface 204 to communicate wirelessly with an external device such as a server or data center that may provide data to computing device 10.

Computing device 10, in various examples, may also include one or more input and/or output devices such as presence-sensitive display 12C. Presence-sensitive display 12C may include a liquid crystal display (LCD) display screen or display screen that uses another type of graphical output technology. Presence-sensitive display 12C may also be a touchscreen, that may include an electrically capacitive layer sensitive to the presence of touch and configured to translate the positions of touch gesture inputs, and the motions of touch gesture inputs as they change position over time, into signals to provide to a driver for the touchscreen or other feature for receiving the information on the gesture inputs. Presence-sensitive display 12 may also be another type of presence-sensitive display in other examples.

Computing device 10 may also include or be configured to connect with any of a variety of other input and/or output devices such as physical buttons, a physical keyboard, a mouse, a touchpad, a trackball, a voice user interface system, a vibration component, a sound card, a video graphics adapter card, or any other type of device for detecting and/or interpreting inputs from a user or for converting a signal into a form of graphical, audio, tactile, or other form of user output that can be sensed by a user.

Computing device 10C, in various examples, may include one or more power sources 208, which may be rechargeable and provide power to computing device 10C. Power source 208, in various examples, may be a lithium-ion battery, a nickel-cadmium battery, a nickel-metal hydride battery, or other suitable power source.

Computing device 10 may also include one or more force-sensitive sensors such as accelerometer 222, compression sensor 224, acoustic sensor 226, a gyroscope, or other types of sensors capable of detecting acceleration, compression, vibration, rotation, or other indicator of force applied to computing device 10. Accelerometer 222 may measure any acceleration of computing device 10, and therefore detect any net force applied to computing device 10, including the net force from a user tapping anywhere on computing device 10, including through a pocket, a handbag, or other intervening material. Compression sensor 224 may detect a compressive force to computing device 10 or one or more portions of the surface of computing device 10, and could detect an applied force in the form of a compression or a squeezing action applied to computing device 10. Acoustic sensor 226 could detect an applied force in the form of a mechanical or acoustic vibration, which may include vibrations transmitted through intervening materials between a surface a user applies a force to and computing device 10. For example, computing device 10 may be positioned in a user's pocket or in a wristwatch or armband form factor, and detect when the user taps another area of the user's body, through acoustic vibrations transmitted from the tapped area through the user's body (e.g., through the user's skeletal system) to the computing device 10. Computing device 10 may include multiple accelerometers 222, compression sensors 224, and/or acoustic sensors 226, and may use one or multiple of one of these types of sensors or one or multiple of multiple types of these sensors, any of which may facilitate reliable detection and processing of such force-based input signals.

FIGS. 3-6 are example graphs 30, 40, 50, 60, respectively of force or acceleration over time corresponding to force-based inputs as may be detected by an accelerometer, compression sensor, acoustic sensor, gyroscope, or other sensor operatively connected to a mobile computing device, in accordance with aspects of the present disclosure. Each of graphs 30, 40, 50, 60 shows a measure of force over time as detected by a sensor such as accelerometer 222, etc. on computing device 10. The force sensor may communicate the detected force data represented by the graphs 30, 40, 50, 60 to other elements of computing device 10 of FIG. 2, such as processor(s) 200, to compare the data represented by the graphs 30, 40, 50, 60 with parameters for stored force-based inputs to determine if the detected force data matches one of the corresponding inputs. While graphs 30, 40, 50, 60 are not labeled with units, the details of units for a suitable user input profile of force over time for a force-based input may be calibrated in accordance with user interface engineering practices, and stored parameters for force-based user inputs may be calibrated according to typical user behavior for tapping or other inputs and the system responses of a given computing device to such force-based user inputs.

Figure 3:
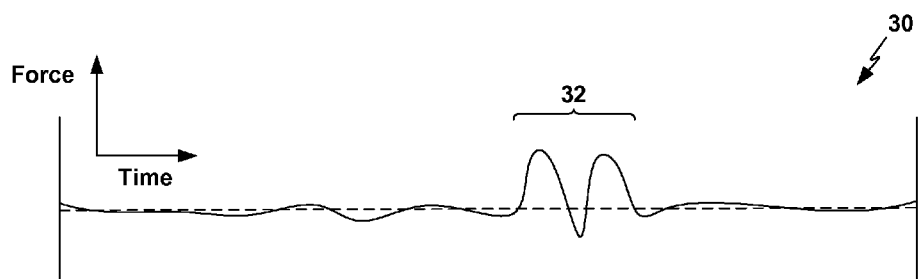
FIGS. 3-6 are example graphs of acceleration over time corresponding to force-based inputs as detected by an accelerometer operatively connected to a mobile computing device, in accordance with aspects of the present disclosure.

FIG. 3 shows a pattern of an applied force detected by computing device 10 over time that is close to zero for much of the time (including minor vibrations or ambient low-level motions), but that includes two close, distinct peaks in force at signal 32 that are consistent with a sequence of two taps by a user on computing device 10, whether directly or through intervening materials. Computing device 10 may initially filter out minor motions such as those on graph 30 outside of signal 32 as being too small to register as a user input, so that computing device 10 doesn't expend too much processing activity and power on performing substantial processing of force signals and process false positives as user inputs, in some examples. If a signal for an applied force is of the right strength and duration to be a good candidate signal, computing device 10 may process the signal according to more rigorous mathematical methods to compare to stored parameters of user input signals, which may be based on an analytical rules system or on a system trained by machine learning techniques on sample user inputs, for example. Computing device 10 may also perform further steps in response to a candidate signal, such as comparing other aspects of the current operating context of computing device 10, such as whether a phone call is currently incoming or whether the display is activated, for example.

Computing device 10 may have one set of stored parameters for a force-based user input of a double-tap sequence that corresponds to the applied force signal 32 shown in FIG. 3. The particular corresponding input, i.e., the particular corresponding set of stored parameters that match the sensor data of signal 32, may be any input to any application. The particular corresponding input may also have an initial default input that might be determined by the operating system 190 or be pre-selected by a vendor of computing device 10, for example, and may be freely user-configurable to any other input that a user selects. The particular corresponding input may also be selected differently based on the current operating context when the signal 32 is detected, so that the signal 32 may be interpreted as one input in a default context, or a second input when a new phone call is incoming, or a third input when simultaneous data from other sensors show that the user is currently driving a car, for example. In particular, a default setting in a default context might be to respond to the double-tap input of signal 32 by generating an audio output of the current time and information about any recently received emails or text messages, for example. If a new phone call is currently incoming while the computing device 10 receives the double-tap input of signal 32, the default setting in this context may be to generate an audio output identifying the caller, for example. If the computing device 10 receives the double-tap input of signal 32 while it detects that the user is currently driving a car, such as by communicating with the car, or by detecting motion at typical car speeds via position sensors (e.g., GPS and/or WiFi position sensors) and recognizing that the particular car belongs to the user, computing device 10 may respond by generating audio outputs for a street navigation voice user interface, for example. Any other corresponding functions and outputs may also be used or selected in any of these contexts for responding to the force-based user input corresponding to the detected force of signal 32.

Figure 4:
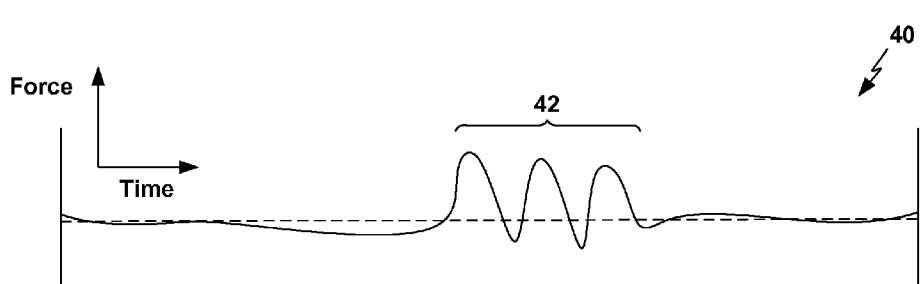
Figure 5:
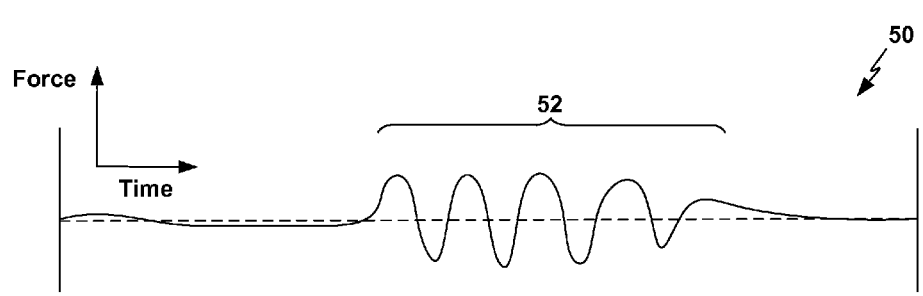
Figure 6:
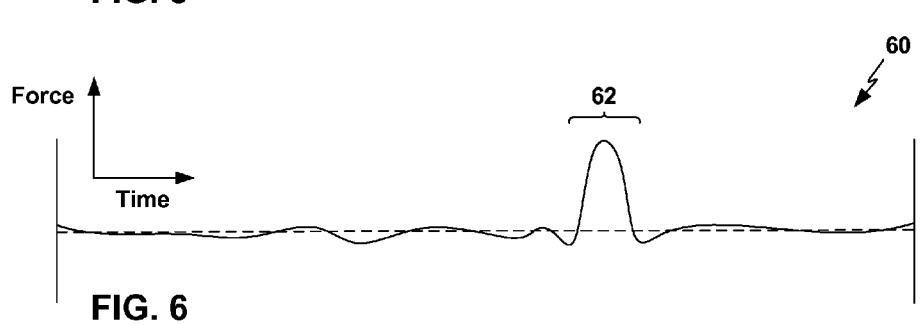

Similarly, any default or user-configurable function and output may be selected to correspond to other user inputs such as those represented by signal 42 in graph 40 of FIG. 4 (corresponding to a user's sequence of three taps), signal 52 in graph 50 of FIG. 5 (corresponding to a user shaking the computing device 10), signal 62 in graph 60 of FIG. 6 (corresponding to a single tap by the user), or other signals. As another example, computing device 10 may also interpret taps to different portions of itself as different inputs, e.g., it may distinguish between a tap to its front or back, or to a side edge or a corner, and apply different non-visual responses based on those different inputs. Computing device 10 may differentiate among these inputs through inputs to accelerometers in different orientations or different positions within the body of computing device 10, for example. The signals shown in FIGS. 3-6 are examples, but any other type or pattern of signal may also be saved as a user input parameter and may be interpreted as a corresponding user input. Other examples may also incorporate signals from various types of force-based sensors, such as a signal corresponding to one or more squeezes or compressions of one or more compression sensors. Regarding a detected force corresponding to a single tap as in FIG. 6, computing device 10 may in some examples apply default responses to this input only in special operating contexts such as during an incoming phone call (e.g., when the phone is ringing), but apply no action in a default operating context, since a single, temporary force may be likely to arise from time to time from ordinary motions, so that avoiding a response in ordinary contexts helps prevent interpreting ambient motions as false positives when they are not inputs intended by the user.

Figure 7:
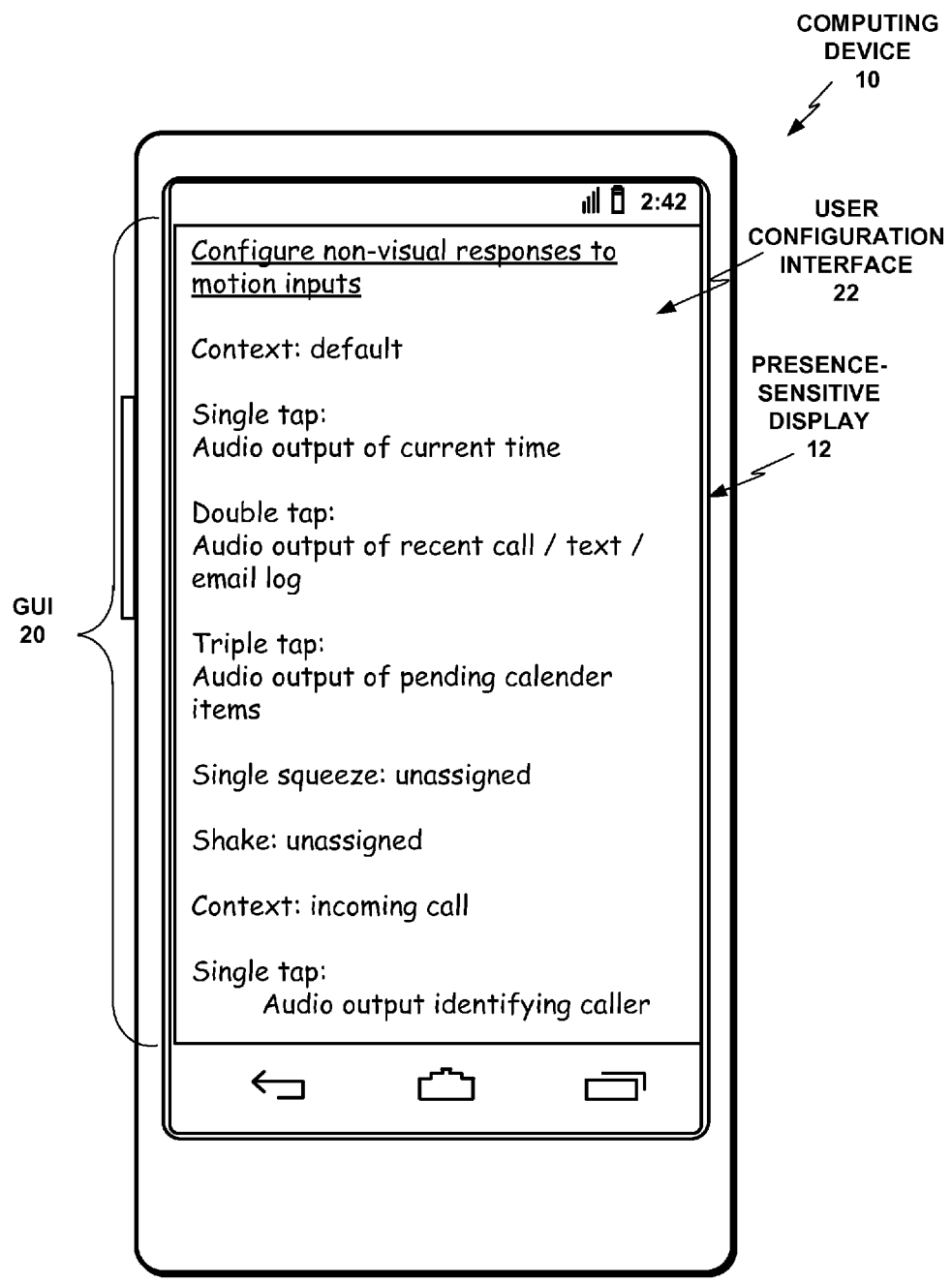
FIG. 7 depicts a computing device with graphical user interface (GUI) and outputting GUI content for a representative portion of an example user configuration interface for a non-visual I/O application that generates non-visual outputs in response to force-based inputs, in accordance with aspects of the present disclosure.

FIG. 7 depicts computing device 10 with graphical user interface (GUI) 20 and outputting GUI content for a representative portion of an example user configuration interface 22 for non-visual I/O application 120 that generates non-visual outputs in response to force-based inputs, in accordance with aspects of the present disclosure. Computing device 10 renders GUI 20 on presence-sensitive display 12, which may be a touchscreen. As shown on presence-sensitive display 12, user configuration interface 22 includes a variety of operating contexts, and a variety of force-based user inputs listed under each operating context, along with the corresponding non-visual output functions that may be assigned to each corresponding force-based input. As shown in FIG. 7, the example settings currently depicted by user configuration interface 22 include a default context and an "incoming call" context. As further shown in FIG. 7, non-visual output functions assigned to various force-based inputs under the default context include an audio output of the current time for a single tap (corresponding to detected force signal 62 in FIG. 6); an audio output of information about recently received phone calls, text messages, and emails, corresponding to a double tap input (corresponding to detected force signal 32 in FIG. 3); and an audio output of information about pending calendar items in response to a triple tap input (corresponding to detected force signal 42 in FIG. 4). FIG. 7 also shows that a single squeeze input and a shake input under the default context are currently unassigned, and that a single tap under the context of a currently incoming phone call is assigned to generate an audio output identifying the caller.

User configuration interface 22 may also scroll down to reveal many additional input/output assignments under the incoming phone call context or any of various other operating contexts. User configuration interface 22 may also include options for the user to add additional inputs and assign corresponding functions and outputs. The user may be enabled to select additional inputs from a list, or to define a new force-based input kinematically with the computing device 10 recording whatever pattern of force the user applies to it, to generate a new user-defined force-based input. Computing device 10 may also enable the user to define any non-visual output to be generated in response to a selected input, and may provide tools to allow a user to integrate functions of any application with the non-visual I/O system of this disclosure and assign any function of any application as an output with which the non-visual I/O system integrates and generates in response to a force-based user input.

For one or more pre-stored or user-defined non-visual I/O selections, computing device 10 may store a plurality of force parameters associated with a plurality of force inputs, such that determining that the detected force matches the corresponding input comprises comparing the detected force with force signal parameters associated with the plurality of force inputs, such as described with reference to FIGS. 3-6.

Computing device 10 may also enable a variety of one or more additional inputs indicating various additional operating contexts to be differentiated and determined in conjunction with the force-based input. Computing device 10 may also receive an indication of the one or more additional inputs within a defined interval of time of receiving the indication of the detected force applied to computing device 10, and generate a non-visual output based at least in part on the one or more additional inputs. For example, computing device 10 may detect if there is an input from a presence-sensitive display indicating a large area of contact with the presence-sensitive display, such as if the user is applying her palm or a large area of her hand to the touchscreen to apply a tap, which may for example be a useful additional indicator of the user's intention of entering force-based inputs. As another example, computing device 10 may detect an input from a light sensor and determine if the light sensor input indicates a level of light below a selected threshold. Computing device 10 may then apply a different operating context for the user being in the dark, such as when the user is in bed at night. An example differentiated I/O response in this context might be to interpret a selected force-based input to mute the computing device 10, or to generate an audio output confirming that an alarm is on and the time for which it is set, for example.

As another example of shifting non-visual I/O responses by operating context, computing device 10 may compare input from a magnetic field sensor and apply different non-visual outputs based on a direction of travel indicated by the magnetic field sensor, such as during a voice user interface navigation function. As another example, computing device 10 may detect one or more additional inputs from a near-field communication (NFC) tag sensor, and modify the non-visual I/O responses based on the NFC tag detected.

Additionally, any of a wide variety of non-visual outputs may be generated in response to a force-based user input. Some examples may use a force input to initiate a voice user interface so the user may tap the computing device and then issue a speech input, and the computing device may respond with an audio output, including for functions involving search and navigation. In this case, the computing device may detect the speech input as part of performing the corresponding function in response to detecting the corresponding force-based user input that initiates the voice user interface mode.

For example, computing device 10 may receive a speech input and perform a speech-to-text function on the speech input to generate a text query based on the speech input. In one example, computing device 10 may then enter the text query to a search application, wherein generating the non-visual output comprises generating a speech synthesis audio output of the results of the web search. As another example, computing device 10 may then determine a current location based at least in part on one or more position sensors, and perform a location-based search based at least in part on the text query and on the current location, wherein generating the non-visual output comprises generating a speech synthesis audio output of the results of the location-based search. As yet another example, computing device 10 may then determine a current location based at least in part on one or more position sensors, and perform, with a navigation application, a location-based navigational route search based at least in part on the text query and on the current location, wherein generating the non-visual output comprises generating a speech synthesis audio output of the results of the location-based navigational route search.

Computing device 10 may also issue any of a variety of other non-visual outputs, drawing on any of a variety of applications, data sources, or other resources. For example, computing device 10 may generate a speech synthesis audio output of news using data from a news application, or of financial information using data from a financial data application, or with identifying information about an incoming phone call using data from a telephone application. Computing device 10 may apply various other forms of receiving a speech input, performing a speech-to-text function on the speech input to generate a text based on the speech input, and entering the text to an application, to elicit some form of responsive output or data from the application based on the speech input.

Computing device 10 may also apply a variety of location-based functions in non-visual I/O responses. For example, computing device 10 may execute a corresponding function in response to detecting a force-based user input where the corresponding function includes determining a current location based at least in part on one or more position sensors, and performing an additional function or generating an output based in part on the location. This may include starting or stopping a recorded track at the current location in a route tracking application, providing local advertising content relevant to the current location, providing a user check-in to the current location in a location-based social networking application, or marking the current location in a geocaching application, for example.

Computing device 10 may also record and enter speech inputs to any of a variety of applications as part of executing a corresponding function in response to detecting a force-based user input. This may include interaction with an email application, a text message application, or a word processing application, for example. The computing device 10 may perform additional functions such as sending an email or a text message comprising the entered text based on the speech input, or saving the text in a word processing file, for example.

Figure 8:
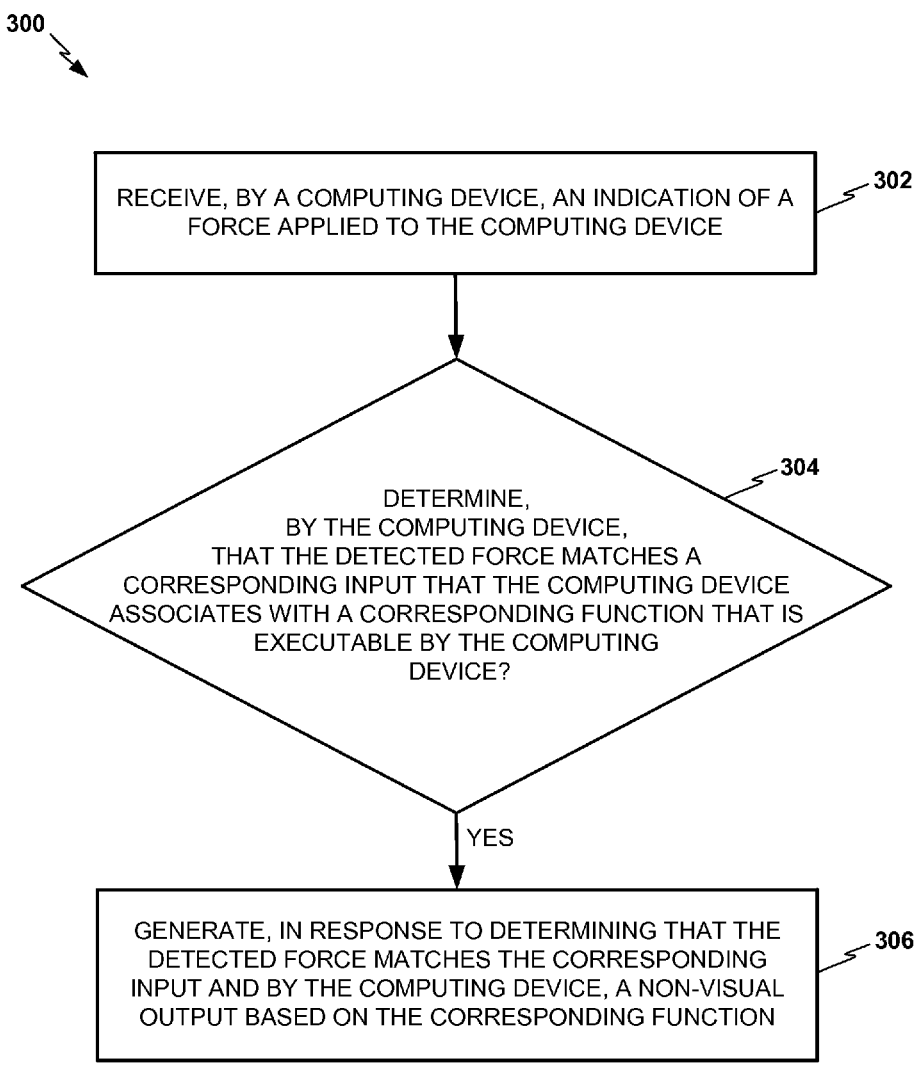
FIG. 8 is a flow diagram illustrating an example process that may be performed by a computing device to generate non-visual outputs in response to inputs that correspond to detected forces in accordance with aspects of the present disclosure.

FIG. 8 is a flow diagram illustrating an example process 300 or method that may be performed by or be embodied in a computing device, such as computing device 10 of FIGS. 1, 2, and 7, and/or any one or more processors thereof, to implement a non-visual I/O system to generate non-visual outputs in response to inputs that correspond to detected forces, in accordance with any of the examples described above. Process 300 is only one example, and other implementations may include more or fewer aspects than those depicted in FIG. 8.

In process 300, a computing device 10 or processor(s) 200 thereof may execute instructions, such as those of non-visual I/O application 120. In this example, a sensor (e.g., accelerometer 222, compression sensor 224, acoustic sensor 226) of computing device 10 or that is operatively connected to computing device 10 detects a force applied to the computing device 10, and conveys a digital signal or other data that indicates that detected force. Computing device 10 or processor(s) 200 receives this indication of a force applied to computing device 10 (302). Computing device 10 or one or more processor(s) 200 of computing device 10 determines that the detected force matches a corresponding input that computing device 10 associates with a corresponding function that is executable by computing device 10 (304). For example, the detected force may be characterized by force parameters that are consistent with a user tapping, squeezing, or shaking computing device 10, with one or more taps, squeezes, or shakes, and which may be within an interval of time of each other. Computing device 10 may associate different force inputs with different force parameters with different corresponding functions, so that each of the corresponding functions may be indicated by a different force input, as described above with reference to FIGS. 3-7. Computing device 10 or one or more processor(s) 200 then generates, in response to determining that the detected force matches the corresponding input, a non-visual output based on the corresponding function (306). The computing device may further perform any of the functions and processes described above with reference to FIGS. 1-7.

Various techniques described herein may be implemented in software that may be written in any of a variety of languages, making use of any of a variety of toolsets, frameworks, APIs, programming environments, virtual machines, libraries, and other computing resources, as indicated above. For example, software code may be written in Java, C, Objective-C, C++, Go, JavaScript, Dart, Python, Ruby, Clojure, assembly language, machine code, or any other language. As one specific illustrative example, aspects of the disclosure discussed above may be implemented in a software module written in Java that is executable on virtual machine 198 of FIG. 7, for example.

Aspects of the disclosure may be equally applicable and implemented in any computing device or any operating system, and using any other APIs, frameworks, or toolsets. Aspects described herein for decoding and processing of data for force-based inputs and non-visual outputs, which may interact with any other data store or application. When implemented in software or firmware, various techniques disclosed herein may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that may comprise non-transitory media. The term "non-transitory" may indicate that the storage medium is not embodied in a carrier wave or a propagated signal. In certain examples, a non-transitory storage medium may store data that can, over time, change (e.g., in RAM or cache). Data storage devices may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format. Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, or software code written in any higher-level programming language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1-8, as well as additional embodiments, are within the scope of one or more of the following claims.

What is claimed is:

1. A method comprising:
   receiving, by a computing device, an indication of a detected force applied to the computing device;
   receiving, by the computing device, a speech input;
   determining, by the computing device, that the detected force matches a corresponding input that the computing device associates with a corresponding function executable by the computing device;
   responsive to determining that the detected force matches the corresponding input performing, by the computing device, a speech-to-text function on the speech input to generate a text query that is based at least in part on the speech input;
   providing, by the computing device, the text query to an application that performs a search based at least in part on the text query; and
   generating, by the computing device and based on the corresponding function, a non-visual output, wherein generating the non-visual output comprises generating speech output of at least one result of the search performed by the application.

2. The method of claim 1, further comprising:
   determining, by the computing device, that the force is applied to the computing device while a presence-sensitive display operatively connected to the computing device is in a deactivated state; and
   generating, by the computing device and in response to determining that the force matches the corresponding input and that the force was applied to the computing device while the presence-sensitive display was in the deactivated state, the non-visual output.

3. The method of claim 2, wherein the deactivated state of the presence-sensitive display comprises the presence-sensitive display being either off or locked.

4. The method of claim 2, further comprising maintaining, by the computing device, the presence-sensitive display in the deactivated state while generating the non-visual output.

5. The method of claim 1, further comprising receiving, by the computing device, the indication of the detected force from a sensor operatively connected to the computing device, the sensor comprising at least one of an accelerometer, a compression sensor, and an acoustic sensor.

6. The method of claim 1, wherein the corresponding input that the computing device associates with the corresponding function is consistent with a single tap.

7. The method of claim 1, wherein the corresponding input that the computing device associates with the corresponding function is consistent with a sequence of two or more taps.

8. The method of claim 1, wherein the corresponding input that the computing device associates with the corresponding function is consistent with a subsequent tap within a time interval after a prior output.

9. The method of claim 1, wherein the corresponding input that the computing device associates with the corresponding function is consistent with a squeeze.

10. The method of claim 1, wherein the corresponding input that the computing device associates with the corresponding function is consistent with an oscillating acceleration indicative of the computing device being shaken.

11. The method of claim 1, further comprising storing, by the computing device, a plurality of force parameters associated with a plurality of force inputs, wherein determining that the detected force matches the corresponding input comprises comparing the detected force with force parameters among the plurality of force parameters associated with the plurality of force inputs.

12. The method of claim 11, further comprising providing, by the computing device, a user configuration interface that enables the force parameters associated with the plurality of force inputs to be user-configurable.

13. The method of claim 1, further comprising:
   receiving, by the computing device, an indication of one or more additional inputs within a defined interval of time of receiving the indication of the detected force applied to the computing device,
   wherein generating the non-visual output by the computing device is also based at least in part on the one or more additional inputs.

14. The method of claim 13, wherein the one or more additional inputs comprise at least one of:
   an input from a position sensor indicating at least one of a position and a velocity;
   an input from a network interface indicating at least one of a position and a velocity;
   an input from a Global Positioning System interface indicating at least one of a position and a velocity;
   an input from a light sensor indicating a level of light; and
   an input from a magnetic field sensor indicating at least one of a velocity and an orientation.

15. The method of claim 1, further comprising:
   determining, by the computing device, a current location based at least in part on one or more position sensors, wherein the search comprises a location-based search based at least in part on the text query and on the current location.

16. The method of claim 1, further comprising:
determining, by the computing device, a current location based at least in part on one or more position sensors,
wherein the search comprises a location-based navigational route search based at least in part on the text query and on the current location.

17. A method comprising:
receiving, by a computing device, an indication of a detected force applied to the computing device;
determining, by the computing device, that the detected force matches a corresponding input that the computing device associates with a corresponding function executable by the computing device; and
responsive to determining that the detected force matches the corresponding input generating, by the computing device and based at least in part on the corresponding function, a non-visual output, wherein generating the non-visual output comprises generating speech output comprising at least one of:
a current time using data from a clock application;
news using data from a news application;
financial information using data from a financial data application;
information about an incoming phone call using data from a telephony application;
information from one or more email messages using data from an email application;
information from one or more text messages using data from a text message application; or
information from one or more social networking messages using data from a social networking application.

18. A computing device, comprising:
at least one processor,
wherein the at least one processor is configured to:
while a display of the computing device is off,
receive an indication of a detected force applied to the computing device;
determine a current location based at least in part on one or more position sensors;
determine that the detected force matches a corresponding input that the at least one processor associates with a corresponding function that is executable by the at least one processor; and
responsive to determining that the detected force matches the corresponding input, generate, based on the corresponding function and the current location, a non-visual output.

19. The computing device of claim 18,
wherein generating the non-visual output comprises starting or stopping a recorded track at the current location in a route tracking application.

20. The computing device of claim 18, further comprising:
determining a current location based at least in part on one or more position sensors,
wherein generating the non-visual output comprises providing local advertising content relevant to the current location.

21. The computing device of claim 18,
wherein generating the non-visual output comprises providing a user check-in to the current location in a location-based social networking application.

22. The computing device of claim 18,
wherein generating the non-visual output comprises marking the current location in an application that tracks positions.

23. A non-transitory computer-readable storage medium comprising instructions that are executable by at least one processor to:
receive an indication of a detected force applied to a computing device;
determine that the detected force matches a corresponding input that the at least one processor associates with a corresponding function that is executable by the at least one processor;
receive a speech input;
perform a speech-to-text function on the speech input to generate a set of text based on the speech input; and
responsive to determining that the detected force matches the corresponding input, generate, based on the corresponding function, a non-visual output, wherein generating the non-visual output comprises entering the set of text to an application.

24. The non-transitory computer-readable storage medium of claim 23, wherein the application comprises at least one of: an email application, a text message application, or a word processing application, and wherein the instructions are further executable by the at least one processor to perform at least one of: sending an email comprising the text, sending a text message comprising the text, and saving the text in a word processing file.

* * * * *